United States Patent [19]

Velarde

[11] Patent Number: 5,696,966
[45] Date of Patent: Dec. 9, 1997

[54] SERVICE ORDER SYSTEM HAVING STAGED DATABASES WHICH PERFORM REQUEST VALIDATION AND CONFLICT RECOGNITION

[75] Inventor: Samuel F. Velarde, Colorado Springs, Colo.

[73] Assignee: MCI Communications Corp., Washington, D.C.

[21] Appl. No.: 559,971

[22] Filed: Nov. 17, 1995

[51] Int. Cl.$^6$ .................................................. G06F 17/30
[52] U.S. Cl. ........................ 395/610; 395/608; 395/609
[58] Field of Search ..................................... 395/608, 609, 395/610

[56] References Cited

U.S. PATENT DOCUMENTS

| | | | |
|---|---|---|---|
| 5,274,806 | 12/1993 | Hill | 395/610 |
| 5,403,639 | 4/1995 | Belsan et al. | 395/620 |
| 5,471,615 | 11/1995 | Amatsu et al. | 395/200.03 |
| 5,559,949 | 9/1996 | Reimer et al. | 395/327 |
| 5,586,312 | 12/1996 | Johnson et al. | 395/610 |

Primary Examiner—Wayne Amsbury

[57] ABSTRACT

A number of work stations are configured as clients in a client-server environment. The clients enter requests that must be validated and approved prior to loading into mainframe databases. This occurs by staging. The server connected to the various workstation clients is a mid-range server that cooperates with a mid-range database. The mid-range database allows the mid-range server to check incoming requests against other requests being processed by the system. If the request does not repeat or conflict with a request undergoing processing by the system, as noted by the mid-range database, the request is transferred to a staging database, connected to a universal server. The universal server accesses the mainframe databases to perform more precise checks of the request. If validated, the request is entered into a mainframe database and the mid-range database is updated accordingly.

6 Claims, 5 Drawing Sheets

1

SERVICE ORDER SYSTEM HAVING STAGED DATABASES WHICH PERFORM REQUEST VALIDATION AND CONFLICT RECOGNITION

FIELD OF THE INVENTION

The present invention relates to client-server computer systems, and, more particularly, to such a system using multiple staged databases to protect data stored on mainframe databases.

BACKGROUND OF THE INVENTION

Client-server systems, capable of accommodating multiple workstations, are commonplace. A problem arises when workstations having comparable access to mainframe databases generate via a server, conflicting or invalid data that corrupts the databases. For example, in processing service orders for a telephone network, such as that of MCI, a service order request is entered at the workstation and some time elapses between the entry of the data and final validation and approval. Such a validated and approved service order is then entered into an appropriate mainframe database for eventual execution. It is important, while such a validation and authorization process occurs, to prevent a subsequent workstation from either repeating the same type of service order request, or entering an order that would conflict or corrupt the order in process.

Accordingly, it is necessary to provide a staged operation between a workstation client, a mid-range server, and, ultimately, the mainframe databases. This would check each incoming service order in stages, entered by a workstation, to determine whether such a request would unnecessarily repeat, or conflict with, a previously made request, by another workstation, which is in process. A check is also made as to whether the request can be handled by the customer's installation.

BRIEF DESCRIPTION OF THE PRESENT INVENTION

The present invention includes a client-server environment. The server acts as a mid-range server in conjunction with a mid-range database. The mid-range database includes periodically updated information, from mainframe databases, concerning data that is being processed. For example, the mid-range database may include information, by customer, of service orders undergoing processing for validation and authorization prior to service order execution. In this way, if a workstation client repeats or presents a conflicting service order request, the mid-range server can detect this problem relative to data stored in the mid-range database. This mid-range checking therefore provides a first stage in a validation of a service order request.

If valid to this point, the newly-entered service order request is transferred to a mainframe universal server that cooperates with a staging database. The universal server checks the more comprehensive mainframe databases which store customer information as well as requests being processed. In the event the request, being stored in the staging database, is ultimately validated and approved, the universal server downloads the request to an appropriate mainframe database. Updates from the mainframe databases are continually transmitted back to the mid-range database so that more accurate initial checking can subsequently be accomplished.

As will be appreciated from the previous discussion, the staging of request data, prior to downloading into a mainframe database, avoids repetitive processing, in the case of a duplicate request; or avoids the corrupting of a previous request due to a request that actually conflicts with a previously-entered request.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
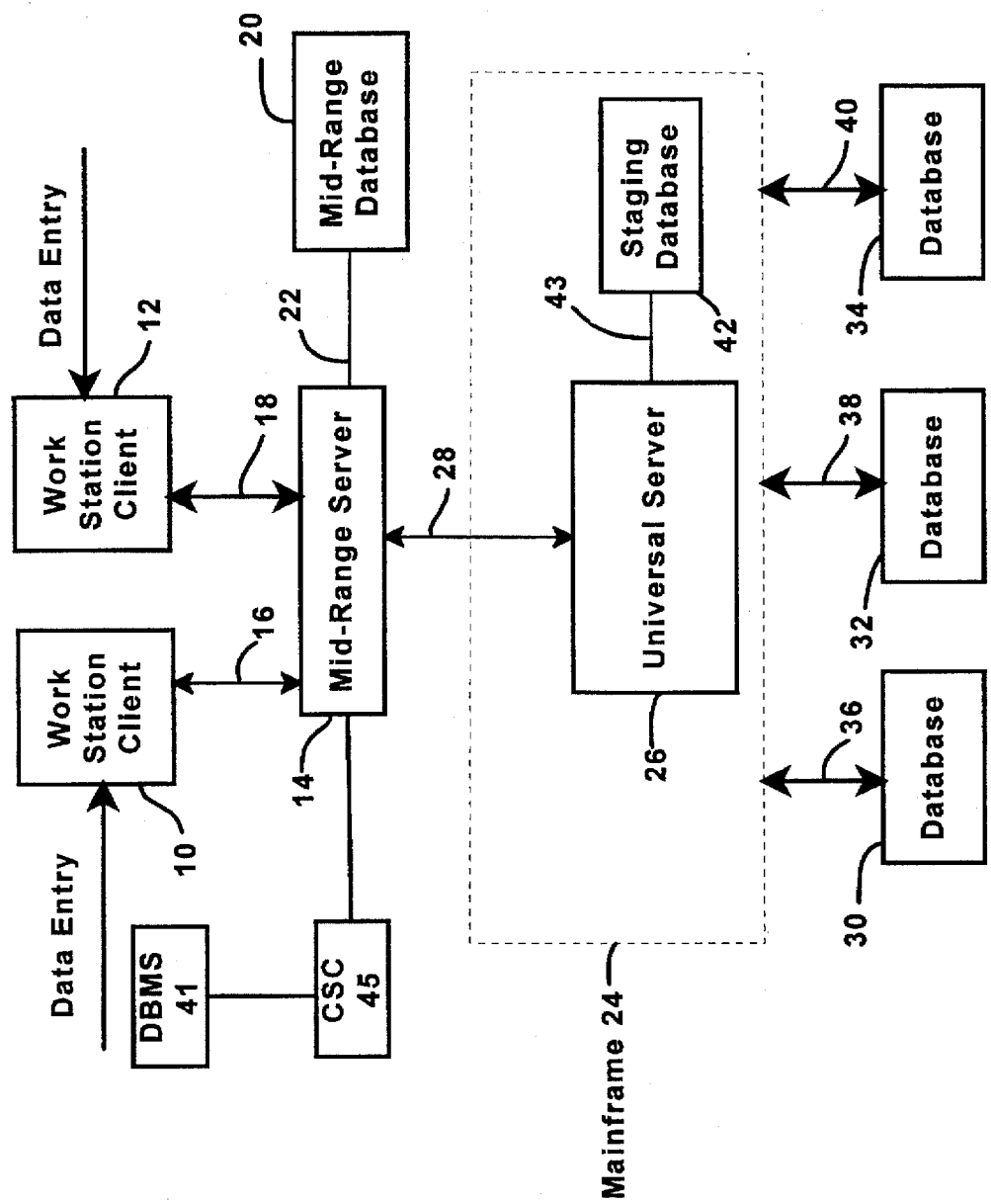
FIG. 1 is a basic block diagram of the architecture of the present invention.

Referring to FIG. 1, a basic block diagram for the present system is illustrated. In a typical application, discussed herein, the present invention may be employed for servicing requests by workstations, such as requests for service orders routinely required for a telephone carrier, such as MCI. A typical example would be the desire, on the part of a customer, to acquire a toll-free 800 number. Such a request is known as a service order request, and the data incident thereto is entered into a system by one of the workstation clients 10, 12. These clients are serviced by a mid-range server 14 via communications links 16 and 18.

A mid-range database 20 communicates with the server, via connection 22, the mid-range database 20 including data incident to previously entered requests that are be undergoing processing by the system. When the mid-range server 14 handles an incoming request, for example an 800 number for a particular customer, that request is compared to customer and related service data stored in the mid-range database 20 that received such data from the mainframe databases. If the server 14 determines that an identical request was previously made, or is in conflict with a previously made request, the mid-range server 14 will not process the entered request. The workstation client is thus informed.

In the event there is no repeated request or other conflict, the request is transferred to a staging database via a path including: communication link 28, universal server 26, and link 43. The universal server 26 is preferably a software application on mainframe computer 24 that controls the flow of data from the mid-range database 20 to the staging database 42.

The staging database 42 stores request data received from the mid-range database 20, and which has been preliminarily approved at the level of the mid-range server 14. The universal server 26 then performs a second staged validation and authorization of the request. This is accomplished by comparing the request, as stored in the staging database 42, with an appropriate mainframe database 30, 32, or 34. The latter-mentioned databases may each contain data, pertinent to particular types of service order requests, customer installation and account data, etc. Appropriate identification fields of an originally entered request will determine which of the mainframe databases are accessed by the universal server 26. The server 26 communicates with the databases 30, 32 and 34 via respective communication links 36, 38 and 40.

Figure 2:
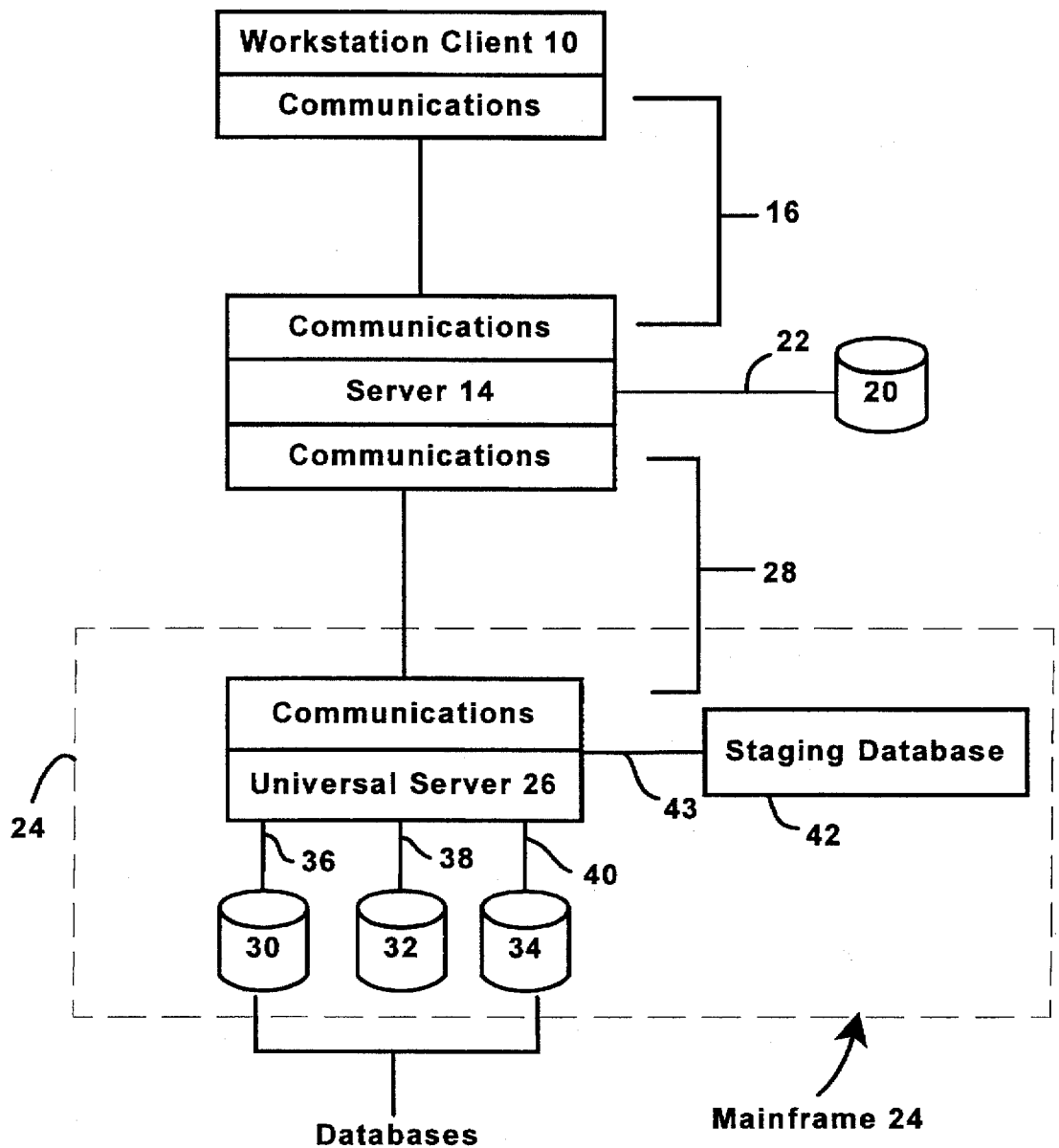
FIG. 2 is a block diagram, based on FIG. 1, indicating the inclusion of communications between various components of the system.

FIG. 2 includes the information of FIG. 1, and delineates layers of communication software included between interfacing components, such as workstation 10, mid-range server 14, and universal server 26. The identification of particular communications software and protocols appear, later in this disclosure, in connection with FIG. 3.

The following discussion indicates the hardware and software used as principle components, in a preferred embodiment of the present invention. With respect to the work server client 14, Intel™-based 80486 PC workstations 10, using OS/2 2.1 (from IBM™ as an operating system, are employed. These workstations provide a graphical user interface (GUI) developed using IBM C Set++, adhering to Common User Access (CUA) and object-oriented methods. The LAN protocol used to communicate with the mid-range server 14 is TCP/IP.

It is anticipated that the workstation clients 10, networked to their respective mid-range server 14 will be capable of accommodating 450 transactions per second. The mid-range server includes two basic components, indicated in FIG. 1 as a Database Management System (DBMS) 43 and a Communications Server Complex (CSC) 45.

Figure 3:
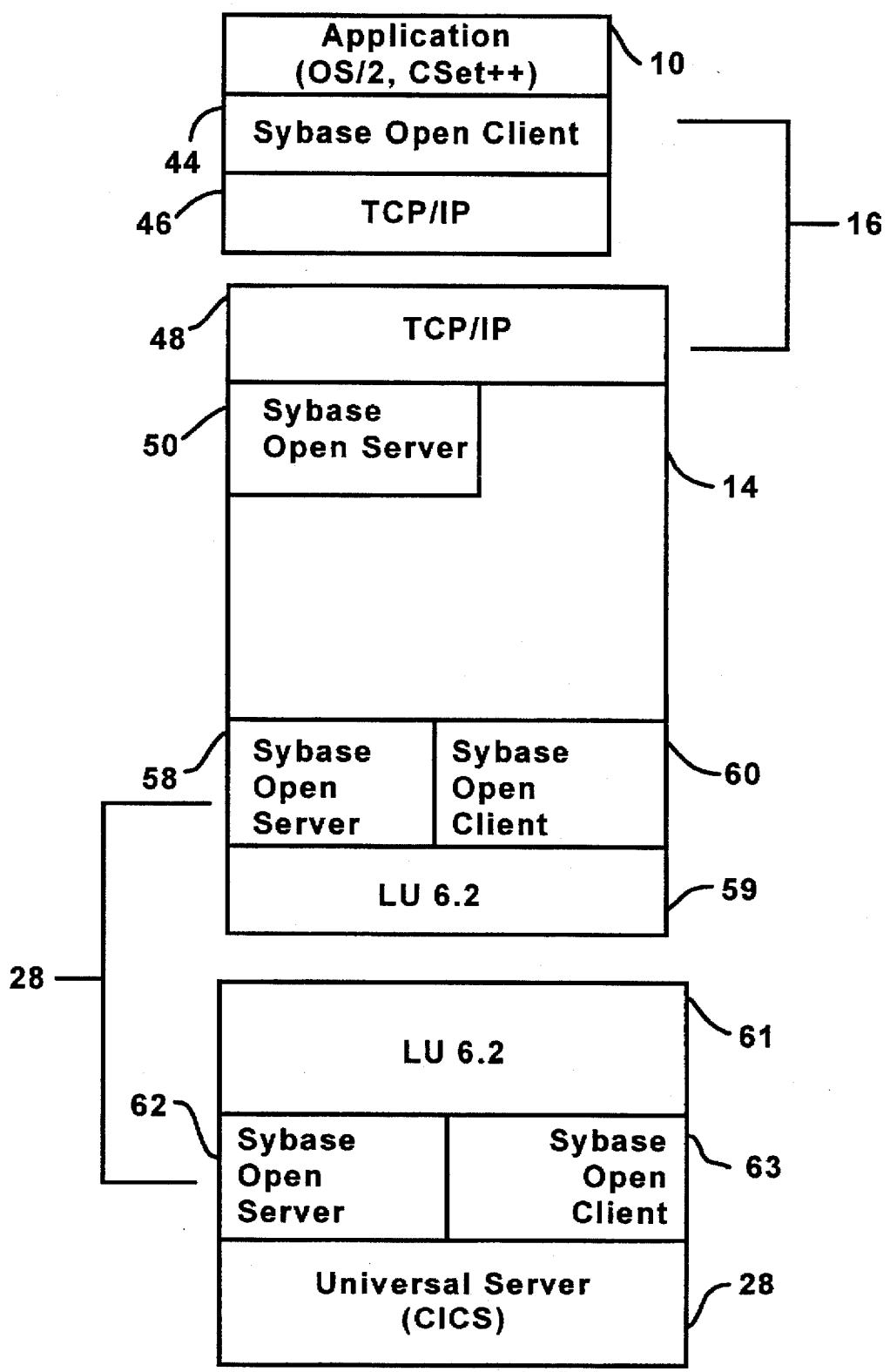
FIG. 3 is a block diagram indicating the transport layer for communications occurring in the present system.

Referring to FIG. 3, the various components of the DBMS and CSC are functionally distributed between the workstation client 10, mid-range server 14, and universal server 26, as will now be explained.

The DBMS consists of Sybase™ Open Client communications software, indicated by reference numeral 44 in FIG. 3. Corresponding software is the Sybase™ Open Server 50. The Open Server and Open Client Sybase products are examples of communications software that provide data access and storage for an order request application from the client 10. In a preferred embodiment, the DBMS components may reside on a Hewlett-Packard 9000 processor, series 800, model E45. Connectivity between the DBMS and various workstation clients 10 occurs via TCP/IP link, more particularly indicated in FIG. 3 at 46 on the client 10, and 48 on the mid-range server 14. Hardware connections between the units may occur over a token ring. Connectivity between the DBMS and CSC (FIG. 1) occurs via TCP/IP over localized thin ethernet.

The CSC 45 (FIG. 1) provides connectivity between the mid-range server 14 and the mainframe computer 24 (FIG. 1). In a preferred embodiment, the CSC may be the well-accepted communications software LU 6.2, corresponding portions of the communications software, is indicated in FIG. 3 by reference numerals 59 and 61. In actuality, clients logon to the DBMS and not the CSC. The DBMS acts as a mediator in servicing requests that are destined for the CSC and the mainframe.

The universal server 26, installed on the mainframe 24, provides the client with the capability of accessing the mainframe databases after validation and approval of an entered request. The universal server is designed to have one entry point for all client requests.

Figure 4:
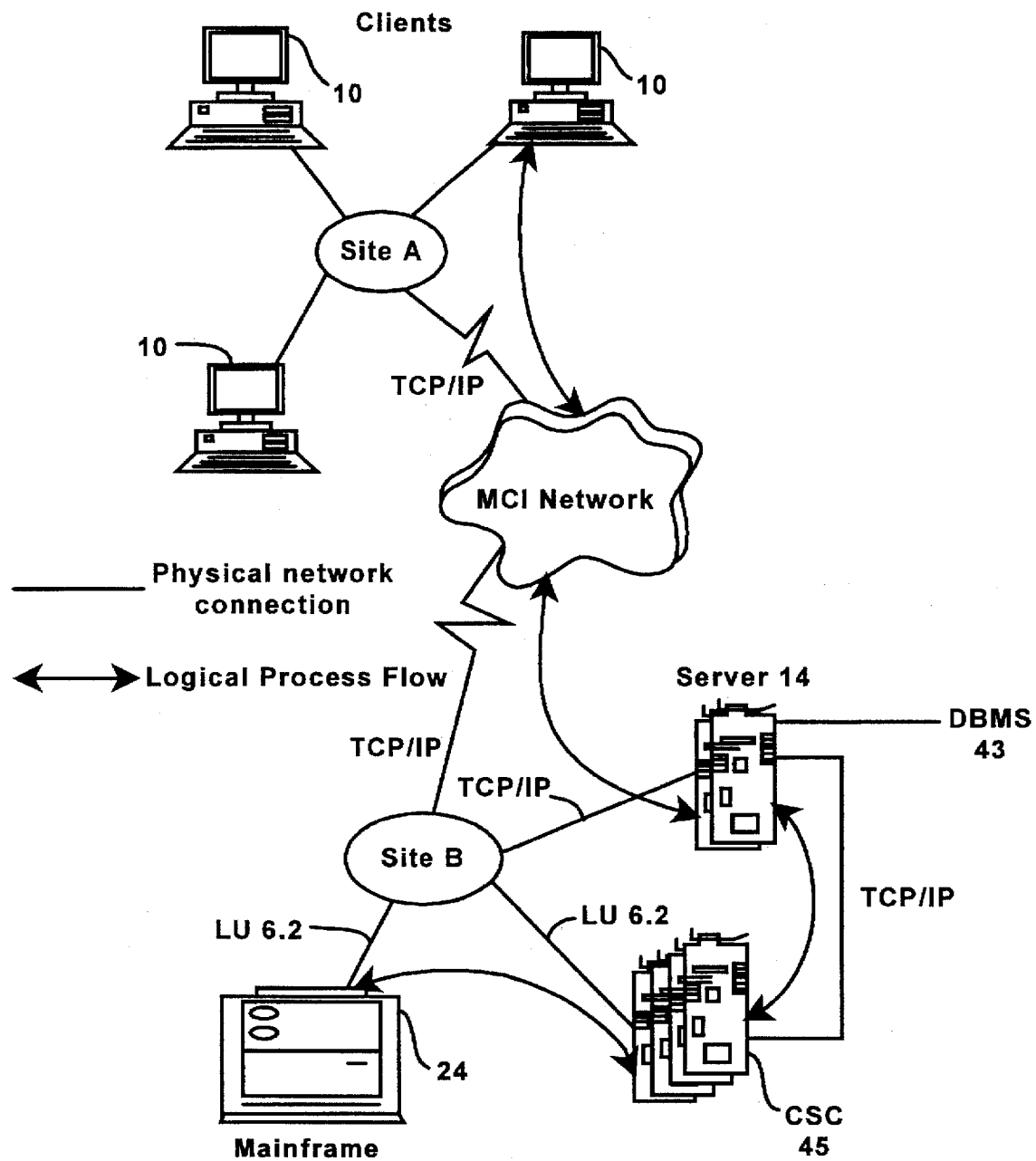
FIG. 4 is a block diagram of the network environment for the present invention.

FIG. 4 illustrates the present system in connection with a service order request system for the MCI network. The server 14 is seen to include the DBMS 43 and CSC 45. In this FIGURE, the logical process flow between components is illustrated by arrow-headed lead lines, while physical network connections are shown by straight lines. Sites A, B, and C are anticipated as being geographically separated, but connected, via TCP/IP protocol to a network, for example, the MCI network.

Figure 5:
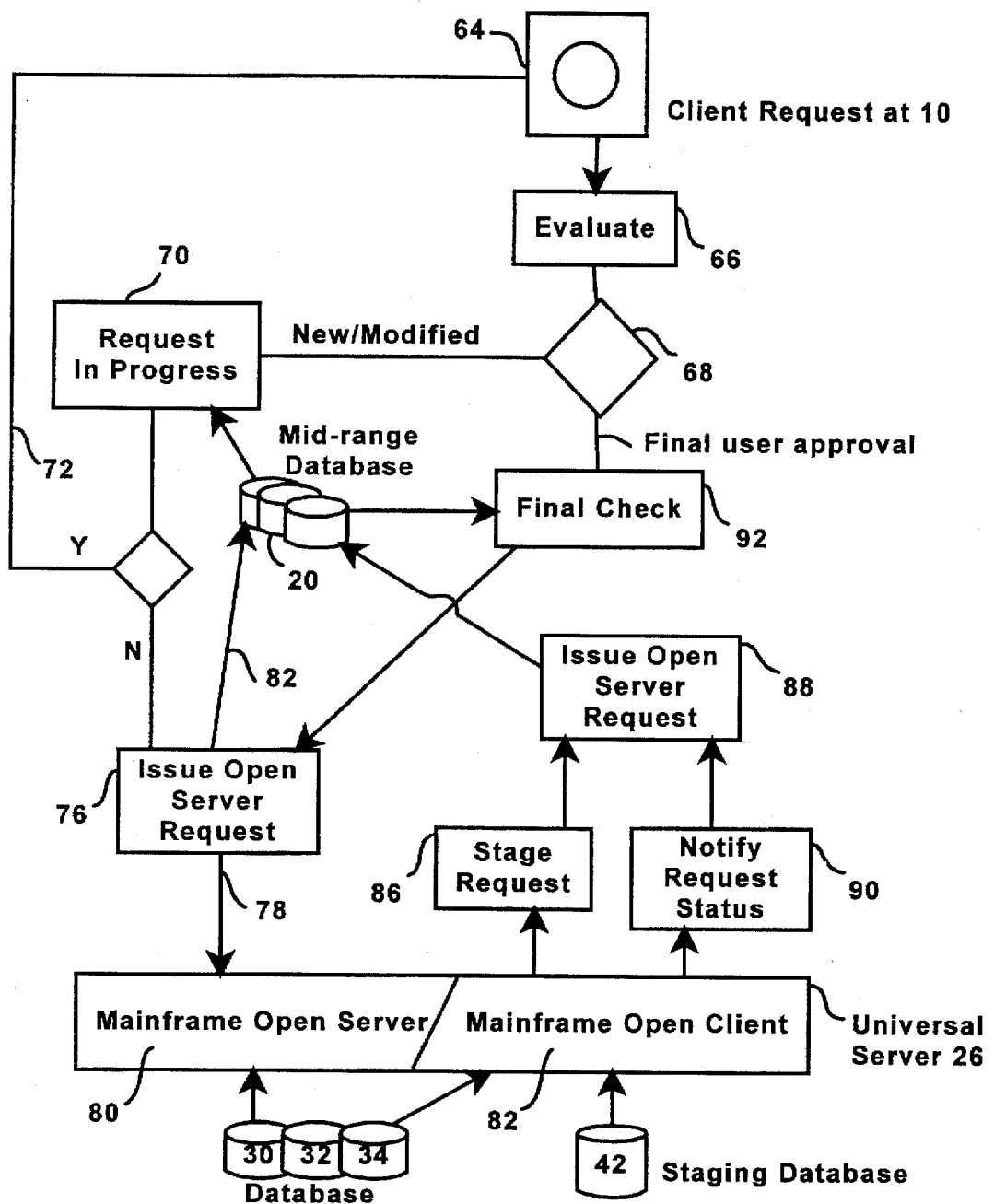
FIG. 5 is a flow diagram for the present invention.

FIG. 5 is a flow diagram for the present system illustrating the overall operation thereof. At step 64, a client enters a service request (on workstation 10). An initial evaluation occurs at step 66 to determine whether this is a modification of an existing request, that the system is working on, for which data is stored in the mid-range database 14; or whether it is, in fact, a new request. If, as indicated in step 70, the request is, in fact, the same request as has been previously entered, and being worked on, the routine returns and appropriate error message, as indicated by path 72. If the request is not a repeat of one undergoing test, the mid-range server 14 issues an open server request at step 76. If a new service request is involved, the request from step 76 retrieves records from the mainframe databases 30, 32 and 34 that establish customer account information and other essential information, such as customer's equipment, when the present invention is utilized in connection with a telephone service order request. Appropriate data from the databases 30, 32 and 34 are communicated through the universal server 26, and more particularly through the mainframe open server portion 80 thereof, to the mid-range database 20.

If the user issues a request to modify an existing service, a request at step 76 checks the validity of the request, by applying rules that would determine conflicts, such as insufficient or conflicting equipment at the customer site. If the request is determined to be valid by the mainframe, the customer and service information is retrieved from the appropriate databases 30, 32 and 34 for storage in the mid-range database 20.

As the user builds the service request, whether it be a new or modified request, validation and data retrieval requests are continually being made against the mid-range and the mainframe databases. This will ensure that data and service integrity are maintained. Once all of the preliminary checks for conflicts occurs, the user will have the opportunity to verify that the request is to be fully processed. This is indicated at step 68, which results in final user approval. At this point, the request goes through a final validation and edit process as indicated at step 92. This process verifies that the request is complete, and does not present conflicts with other user requests. The validation process takes place by reviewing certain data in the mid-range database 20, as well as other data located in the mainframe databases 30, 32 and 34.

The final confirmation that a request is conflict free will go through the posting of the request into the mainframe staging database 42, as indicated by step 86 which initiates a command for request staging, and subsequent step 88 which permits transfer of the appropriate request records from mid-range database 20 to the staging database 42, via the mainframe open client section 82 of the universal server 26.

Once in the staging database, the request is constantly reevaluated for completeness and validity against the mainframe databases 30, 32 and 34. This ensures that no requests, for the same service, have been issued through the mainframe while a previous request is staged. At this point, the request has been fully validated so that it can be posted into an appropriate mainframe database 30, 32 or 34.

Once the fully verified request is posted into an appropriate mainframe database, an appropriate completion status message must be sent to the mid-range database, as indicated by step 90, along with any particular warnings or messages.

The fully validated request remains in the mid-range database and the staging database until executed. In such instance, the mainframe deletes the appropriate records from the mid-range database 20 and the staging database 42.

Thus, as will be appreciated from the preceding description, the present system provides a means for staging requests in a service order environment, which prevents duplicate requests from being processed, as well as preventing processing of conflicting requests. Although the example of service orders for telephone networks is discussed, the invention has application to other environments.

It should be understood that the invention is not limited to the exact details of construction shown and described herein for obvious modifications will occur to persons skilled in the art.

We claim:

1. A system for staging entry of customer service order data into mainframe databases, comprising:

a client workstation for entering service order requests;

a midrange server for accepting requests from a number of workstations;

a midrange database connected to the midrange server for storing the request;

the midrange server performing an initial validation of the request;

a universal server connected to the midrange server and mainframe databases;

a staging database connected to the universal server for storing an initially validated request;

the universal server comparing customer data, acquired from the mainframe databases, against the request stored in the staging database, to determine if conflicts exist with other requests being processed, or with the customer's system;

the request being posted to at least one of the mainframe databases upon conclusion of a favorable comparison by the universal server.

2. The system set forth in claim 1 wherein the universal server is incorporated on a mainframe to which the mainframe databases are connected.

3. A method for entering customer service order data into mainframe databases, comprising the steps:

entering service order requests at a client workstation;

accepting requests from a number of workstations at a midrange server;

transferring requests from the midrange server to a midrange database for storing the request;

performing an initial validation of the request at the midrange server;

connecting a universal server to the midrange server and mainframe databases;

storing an initially validated request in a staging database connected to the universal server;

comparing customer data, acquired by the universal server from mainframe databases, against the request stored in the staging database, to determine if conflicts exist with other requests being processed, or with the customer's system;

the request being posted to at least one of the mainframe databases upon conclusion of a favorable comparison by the universal server.

4. A method for entering customer service order data into mainframe databases, comprising the steps:

generating a service order request at a client workstation, connected together with other client workstations and controlled by a midrange server;

evaluating whether the request is a new or modified request;

evaluating whether the request is a duplication of one previously entered and being processed;

terminating the request if it is a duplication;

checking the request in the mainframe, in the event it is a modification of an existing service request, as to its initial validity;

updating the midrange database with customer and service data from the mainframe databases, in the event the request is a modification of a previously uncompleted request and the request is initially valid;

performing further validation of the request by comparing it to stored data in the midrange database to ensure completeness of the request and that no conflicts exist with other user requests;

continually updating the midrange database with updated mainframe database data as a request is being built to ensure that data and service integrity are maintained;

transferring the request to a staging database upon positive further validation;

performing a final validation of the request by comparing it to stored data in the continually changing mainframe databases to ensure that no requests, for the same service, have been issued through the mainframe while the request was being staged;

posting the request into the mainframe database;

transmitting the status of the posted request to the midrange database along with preselected messages and warnings; and deleting the request from the midrange and staging database after the request is implemented.

5. The method for entering customer service order data into mainframe databases as set forth in claim 4, further comprising the step of requiring a user to sign on the workstation for performing an authorization verification against customer security dam stored in the mainframe databases.

6. The method for entering customer service order data into mainframe databases as set forth in claim 4, further comprising the step of requiring user approval of the request as finally built by the user, before initiating the further validation for ensuring completeness of the request and that no conflicts exist with other user requests.

* * * * *